United States Patent [19]

Eggleton et al.

[11] 4,074,223

[45] Feb. 14, 1978

[54] PEAK DETECTOR FOR RESOLUTION ENHANCEMENT OF ULTRASONIC VISUALIZATION SYSTEMS

[75] Inventors: Reginald C. Eggleton; Warren L. Williamson, both of Indianapolis, Ind.

[73] Assignee: Indianapolis Center for Advanced Research, Indianapolis, Ind.

[21] Appl. No.: 711,359

[22] Filed: Aug. 3, 1976

[51] Int. Cl.² .............................................. G01S 9/66
[52] U.S. Cl. ................................. 340/1 R; 343/5 DP
[58] Field of Search ............ 340/1 R, 1 C; 343/5 VQ, 343/5 DP

[56] References Cited

U.S. PATENT DOCUMENTS

| 3,264,645 | 8/1966 | Hotz | 343/5 DP |
| 3,311,894 | 3/1967 | Chudleigh, Jr. | 343/5 DP |
| 3,454,922 | 7/1969 | Dory | 340/1 R |

*Primary Examiner*—Richard A. Farley
*Attorney, Agent, or Firm*—Woodard, Weikart, Emhardt & Naughton

[57] ABSTRACT

A digital electronic system for improving the resolution and dynamic range-handling capacity for received ultrasound in reflection or transmission imaging system. This system provides a means for preventing loss of structural detail in the display by minimizing the overlapping of signals resulting from the transducer bandwidth and pulse length. It also makes use of a (positive or negative) peak detector to recognize and print as a single point the presence of point targets. With the present technology, a point target may be represented in a B-mode display on several successive scan lines resulting in an abnormally large representation on the display. The actual target is represented by the peak point of the envelope of a series of scan lines in which the point target is displayed. The objective is to print only one point which corresponds with the actual position of the point target and with an intensity that corresponds to the intensity of the received signal. In general, dynamic range compression is required to prevent the wide intensity range of the received ultrasound from either saturating or overdriving the display. To accomplish this objective the received signal amplitudes are continually digitized and stored so that three successive lines of data can be compared. At any given instant of time, three resolution elements from each of these three successive lines are compared. A signal to print is transmitted to the display if the center resolution element of the three-by-three array is equal to or in excess of the surrounding eight resolution elements. The amplitude of the displayed point is established by a transfer function programmed into the system.

11 Claims, 2 Drawing Figures

PEAK DETECTOR FOR RESOLUTION ENHANCEMENT OF ULTRASONIC VISUALIZATION SYSTEMS

BACKGROUND OF THE INVENTION

1. Field of the Invention

This invention is in the field of ultrasonic visualization systems.

2. Description of the Prior Art

In a typical reflection ultrasonic display utilizing a series of B-mode lines, an acoustic pulse is directed at a target or specimen and the returning echoes received are displayed along the scan line. The fundamental frequency of the transmitted pulse is typically in the one megahertz to ten megahertz range. The resulting echoes (r.f.) are detected and the detected (video) signal utilized to produce a display such as on a storage oscilloscope where each line is displayed and stored sequentially to produce a complete view.

A typical Z-axis, or brightness, sensitivity range for an oscilloscope display might be from a 1 volt saturation level to a 0.1 volt minimum detected voltage to produce an indication on the screen. The ultrasonic reflection from a glass target might be as high as 20 volts while the reflection from a biological target might be as low as 20 microvolts. This 120 decibel difference in received voltage cannot be directly displayed on the scope whose full range is only 20 decibels. The alternatives heretofore utilized have been compression of the range of received voltages, rendering differences in intensity impossible to distinguish, and selection of a pair of thresholds above the 0.1 volt minimum received voltage and below the 1 volt maximum received voltage. In this case, where the received voltage exceeds the selected full brightness voltage for the oscilloscope, a large area of the screen will be illuminated, while for other reflections below the selected threshold no indication will be displayed of received ultrasound.

SUMMARY OF THE INVENTION

One embodiment of the present invention is a peak detector system for ultrasonic visualization arrangements comprising first means for storing an electrical representation of received ultrasonic energy which is detected after it has been directed over an area of a target, second means for comparing values of said representations and other representation indicative of received ultrasonic energy which is detected after it has been directed at the target, and third means for producing an output signal, operable to be utilized by a display, indicative of inflection points determined by said second means for comparing.

The larger reflection ultrasound values mentioned above are generally the result of specular reflection, while the generally more desirable scatter reflections indicative of surface texture for a target are considerably lower in amplitude. In order to prevent such desirable scatter reflection signals from falling below the threshold voltage for the display system or exceeding the saturation level of the display, perhaps because of arriving at the transducer superimposed upon a large specular reflection, the present system endeavors to only detect the (positive or negative) peaks of the reflected wave form. This enables the production of a useable display signal that provides visual information on the surface details of structures being viewed.

In order to determine these maxima (or minima), each line of received echoes is divided into digital resolution elements and a series of comparisons performed to locate the maxima, without regard to absolute values of an area of many resolution elements relative to other large areas. In this manner only resolution elements having a value greater than or equal to the immediately surrounding resolution elements will be selected as a peak point. The absolute value of this peak point is then coupled either directly to a display or, preferably, to a memory device which contains one or more transfer functions for converting certain absolute values of reflection to predetermined alternate values which permits the expansion of certain ranges of reflections and the compression of others so that various ranges of reflection values may be emphasized.

It is an object of the present invention to provide an ultrasonic visualization system which effectively enhances the resolution capabilities of the display by detecting and displaying the inflection points of received ultrasound.

It is a further object of the present invention to provide such a system wherein the brightness of the display for such inflections may be varied depending upon a selected transfer function in order to compress the wide dynamic range typical of ultrasonic signals into the relatively narrow dynamic range of the display devices. The system may offer an infinite number of transfer functions from which the optimum transfer function may be selected to best display the data of diagnostic significance.

Further objects of the present invention shall be apparent from the following detailed description and accompanying figures.

DESCRIPTION OF THE PREFERRED EMBODIMENT

Figure 1:
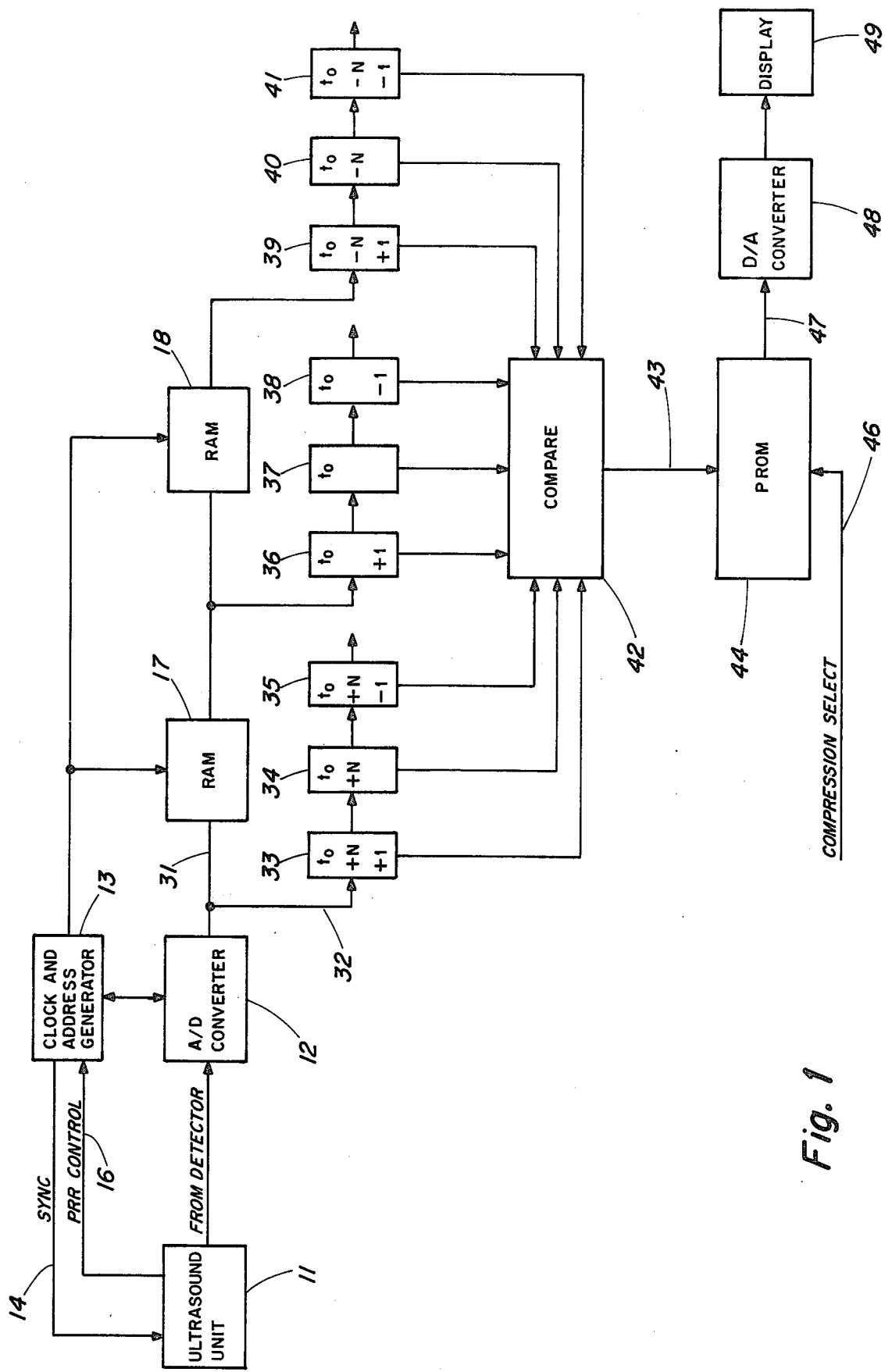
FIG. 1 is a block diagram of an embodiment of the present resolution enhancement system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown an ultrasound unit 11 including an ultrasonic transducer coupled from a pulser which emits ultrasonic pulses at a target at a synchronized rate. The transducer, or a separate transducer, receives reflection or transmission imaging ultrasonic pulses returning after incidence with the target and converts these received pulses to an electrical signal which is detected within the ultrasound unit 11. The detected wave form, which is essentially an envelope of the one megahertz to ten megahertz fundamental frequency ultrasound pulses, is coupled to an analog-to-digital converter 12. Analog-to-digital converter 12 operates at a high digitizing rate, in the exemplary embodiment at ten megahertz. This generates one "resolution element" for each 1/10 of a microsecond. Each line of data to be displayed is therefore divided into a series of resolution elements at each 1/10 of a microsecond. Such an analog-to-digital converter which may be utilized is manufactured by Biomation of Palo Alto, California and is utilized, for example, in their model 610 transient recorder.

A clock and address generator 13 serves to synchronize not only occurrence of the resolution elements for each line but also the timing of the lines themselves. A sync signal is provided on line 14 to coordinate the firing of a transmitted ultrasonic pulse to initiate each line. The spacing between transmitted pulses depends upon the depth to which the specimen or target is to be viewed, due to the inherent delay time in the return of the reflected sound from the target. Throughout the description of the preferred embodiment hereinafter, reference will be made to received ultrasonic echoes from a target but it should be understood that transmission imaging is as useful with the present resolution enhancement system as is echo or reflection imaging.

Clock and address generator 13 also receives a pulse repetition rate control signal from the ultrasound unit on line 16 which indicates the pulse repetition rate of the ultrasound unit so that the generator 13 may produce the appropriate sync signal. Clock and address generator 13 further synchronizes the analog-to-digital converter resolution element rate with the resolution element storage in RAMS 17 and 18 and also syncs the other circuits such as the compare circuit 42, PROM 44 and the D/A converter and display.

Figure 2:
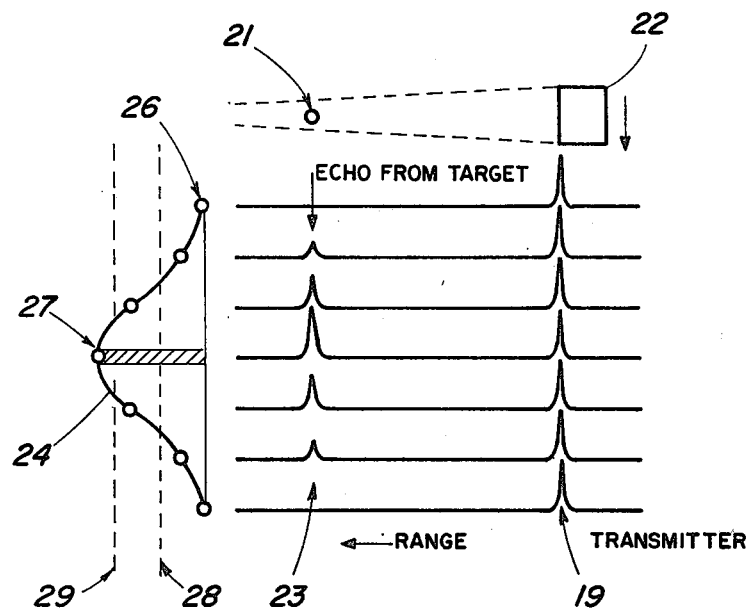
FIG. 2 is a diagrammatic illustration of the resolution improvement obtainable utilizing a system as embodied in FIG. 1.

Referring briefly to FIG. 2, this diagram shows a series of scan lines obtained by moving a transducer across a point target. The lateral representation of a Rayleigh scatterer is in effect a beam plot of the transducer, whereas the desired response is a single point corresponding in range and intensity to the peak point of the lateral analog envelope. The transmitted pulses, as shown at 19, impinge upon the target 21 as transducer 22 is moved downwardly in the direction shown. The echoes from the target are shown generally at 23, and it can be seen that the maximum echo occurs when the transducer beam is aimed most directly at the target. The envelope wave form shown at 24 is generally that obtained from the detector of the ultrasound unit. The threshold and saturation levels for the oscilloscope display may be selected at any pair of heights between the base line 26 and the peak 27 if some portion of this point target response is to be shown on the oscilloscope screen.

For example, the lower threshold may be selected at a level such as 28 and saturation at a level such as 29. In this fashion, the oscilloscope screen would begin to be lit at the level of line 28 with increasing brightness up through the level at 29, and the peak of the envelope above line 29 (or the the left as shown in FIG. 2) would be of uniform maximum brightness.

The desired display for this point target, however, would be a point at the peak of the envelope as indicated at 27. The system illustrated in FIG. 1 will segmentize a given line into the above mentioned resolution elements to compare adjacent resolution elements to determine a peak. This is not illustrated in FIG. 2 since a single point target is shown, and one echo from the target per line occurs in this idealized situation. However, the system of FIG. 1 further compares adjacent lines as to corresponding resolution elements which occur "side-by-side" such as those along area 23 of the figure. Therefore, the system of FIG. 1 would determine that a maximum inflection point occurs at 27 and provide a signal to the oscilloscope display calling for illumination of that point on the screen. The brightness of the point may be determined in some linear fashion or, preferably, one or more transfer functions may be programmed into a memory such as a PROM to provide a nonlinear transfer function which emphasizes particular portions of the response.

Returning now to FIG. 1, at a frequency of line repetition of one kilohertz, or one millisecond per line, as a maximum, 10,000 six bit words must be stored in each of RAM 17 and 18. At higher line frequencies, there would be fewer resolution elements per line and hence less storage necessary. In any event, analog-to-digital converter 12 outputs a six bit word indicative of the analog value of received and detected voltage from the transducer ultrasound unit 11 onto lines 31 and 32 each tenth of a microsecond. RAM 17 stores these six bit resolution elements in appropriately addressed locations as determined by the address generator 13. Resolution elements already stored in RAM 17 are transferred to corresponding addressed resolution element locations in RAM 18 as the new element values reach RAM 17 on line 31.

As can be seen, when the resolution elements of the first line arrive, they are provided to the shift registers on line 32, as shall be discussed hereinafter, and also to RAM 17. When the second line of data arrives, this data is also coupled on line 32 to the shift registers and on line 31 to RAM 17. As the various locations are addressed by generator 13, RAM 17 transfers the values from the first line to RAM 18 while the values for the second line are placed in RAM 17. When the third line of data arrives, it also is moved on line 32 to the shift registers and on line 31 into RAM 17. The second line data is thereupon transferred from RAM 17 to RAM 18 (and also to shift registers) while the first line of data is moved from RAM 18 to its set of shift registers.

As each six bit word is coupled from analog-to-digital converter 12 on line 31 to RAM 17, it is also provided on line 32 to shift register 33. The preceding value in register 33 is shifted to register 34 etc. Similarly, the information for corresponding resolution elements on the previous line are coupled from RAM 17 to shift registers 36 to 38, and the resolution element values for the line previous to that are coupled from RAM 18 to shift registers 39 through 41.

Thus, for example, at a given moment, shift registers 33 through 35 might have resolution elements 81, 82 and 83 in registers 35, 34 and 33 respectively, for line 11 of the display. At that time, the values for resolution elements 81, 82 and 83 would be in shift registers 38, 37 and 36, respectively, for line 10, and the values for resolution elements 81, 82 and 83 would be in shift registers 41, 40 and 39, respectively, for display line 9. These nine digital values are compared by a comparison circuit 42, and if the value from register 37 is greater than or equal to the other eight register values, then the digital value is coupled on line 43 to PROM 44. It can be seen that the value in register 37 is the value for the resolution element which is in the center of a three-by-three array of resolution elements. If a minimum or negative peak point were to be sought, of course, the criterion would be for the center point to be less than or equal to each of the eight others.

The analog-to-digital converter 12 produces the ten megahertz resolution element values resulting in a continuous scan and comparison of these blocks of three-by-three arrays over the entire display as they are received. The registers may be, for example, type 74174 integrated circuits and are synchronized by address generator and clock 13. An example of a 74174 is an N74174 hex D-type flip-flop with clear manufactured by Signetics Corporation, Sunnyvale, California.

The compare circuit 42 is a set of eight comparators comparing the value in register 37 to each of the other eight register values. Type 7485 comparators may be utilized in pairs since six bit words must be compared. An example of a 7485 is an N7485 4-bit magnitude comparator manufactured by Signetics Corporation. The comparators are also synchronized through the operation of the clock and address generator 13. PROM 44, in the exemplary embodiment, is divided into eight sections with the most significant portion of the PROM addresses being input on the compression select line 46 so that one of eight transfer functions may be selected. Then, if a legitimate maximum point is obtained from the compare circuitry 42, the six-bit value for that point is coupled from the output of compare circuitry 42 on line 43 to the PROM. That six bit word is utilized to address a particular storage location in the selected section of the eight transfer function sections. Thus, a desired scale of brightness is provided by the values stored in the PROM, and the actual value of the maximum point is converted to its appropriate value on that scale in PROM 44.

The selected output is then coupled on line 47 to a digital-to-analog converter which provides an analog voltage to effect the proper amount of beam current and illumination on the oscilloscope screen in display 49. Other uses, of course, may be made of the output value for other types of displays, etc.

In regard to RAMS 17 and 18 in the system, the very high data rate required by the peak detection system places a stringent requirement on the memory subsystem. While there are bi-polar memory types which approach or even exceed the required speeds, the required size of the memory (about 120,000 bits) makes the cost of these bi-polar types prohibitive. Therefore, less expensive MOS memory may be utilized for this application and a standard "memory interleaving" technique used to accommodate the lower speed of this memory type.

The technique comprises writing successive data words (six bit binary representations of the signal sample amplitude) into different memory blocks in a cyclic pattern so that if N memory blocks are used, each block handles data at 1/N times the system data rate. Since each of the N blocks is required to store 1/N times as many data words, the total system capacity requirement remains the same (that is, approximately 120,000 bits of memory).

Type 74174 bi-polar latches, which may be thought of as small, high speed buffer memory elements of one data word capacity each, are used at the input and output of each memory block to hold information for the time required to read a data word out of the slow MOS memory and replace it with a new data word.

The CCD460A memory devices utilized require a read-modify-write cycle which is about three to four times that allowed by the data rate of 10 million data words per second. Therefore, four interleaved blocks of memory are used for each "line" of data. Because each data word consists of six bits and each memory device is organized to accept a four bit data word, one and one half memory devices are required for each block of memory. For the two lines of data the required number of memory devices is therefore one and a half memory devices per block times four blocks per line times two lines, or twelve memory devices.

Since the memory is being used as a digital delay line, the number of data words each device can store must be adequate for the longest delay required by the system. For a one millisecond delay in each line and a data rate of 10 million words per second, 10,000 data words per line are required. Each memory device can store 4,096 four-bit words. Therefore, four blocks per line provide 16,384 data words per line which is adequate. The system is designed so that the number of data words of storage which are used may be varied, thereby varying the delay time.

While there have been described above the principles of this invention in connection with specific apparatus, it is to be clearly understood that this description is made only by way of example and not as a limitation in the scope of the invention.

What is claimed is:

1. A peak detector system for ultrasonic visualization arrangements comprising:
   a. first means for dividing received ultrasonic energy into resolution elements;
   b. second means for creating for each resolution element a plural bit word which encodes the value of the received ultrasonic energy in the resolution element;
   c. third means for storing said plural bit words; and
   d. fourth means connected to said third means for comparing said plural bit words and producing at its output a signal indicative of peak points determined by said fourth means for comparing.

2. The system of claim 1 which further comprises fifth means coupled to the output of said fourth means for converting the output of said fourth means to a different value according to a predetermined transfer function.

3. The system of claim 1 in which said received ultrasonic energy is in lines and in which said third means stores resolution elements from two successive lines and said fourth means includes means for comparing corresponding resolution elements of the two successive lines.

4. The system of claim 3 in which said fourth means also includes means for comparing a resolution element in one line with a resolution element adjacent the corresponding resolution element of a successive line.

5. The system of claim 4 in which said fourth means compares a resolution element with its adjacent resolution elements within a line and the corresponding three resolution elements of the previous and successive lines.

6. The system of claim 5 which further comprises fifth means coupled to the output of said fourth means for converting the output of said fourth means to a different value according to a predetermined transfer function.

7. The system of claim 6 in which said fifth means includes means for selecting a transfer function from a plurality of transfer functions.

8. The system of claim 7 in which said fifth means includes a PROM.

9. A peak detector system for line scanning ultrasonic visualization arrangements comprising:

a. means for storing multiple levels of an electrical representation of ultrasonic energy received from a line scanning device, said corresponding multiple levels being related to the values of the received ultrasonic energy within each line of energy received;

b. means for comparing levels in one stored line with levels in an adjacent line;

c. means for producing an output signal indicative of peak points determined by said means for comparing.

10. The system of claim 9 in which said means for comparing includes means for comparing levels in three lines and producing an output equal to the highest level when peak points are determined.

11. The system of claim 10 in which said means for comparing also includes means for comparing levels within a line for indicating peak points.

* * * * *